United States Patent
Massari et al.

(10) Patent No.: US 10,494,468 B2
(45) Date of Patent: Dec. 3, 2019

(54) PROPYLENE POLYMER COMPOSITIONS

(71) Applicant: BASELL POLIOLEFINE ITALIA S.R.L., Milan (IT)

(72) Inventors: Paola Massari, Ferrara (IT); Marco Ciarafoni, Ferrara (IT); Nicoletta Martini, Ferrara (IT); Davide Tartari, Ferrara (IT); Roberto Pantaleoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/093,491

(22) PCT Filed: Mar. 17, 2017

(86) PCT No.: PCT/EP2017/056391
§ 371 (c)(1),
(2) Date: Oct. 12, 2018

(87) PCT Pub. No.: WO2017/178191
PCT Pub. Date: Oct. 19, 2017

(65) Prior Publication Data
US 2019/0338065 A1   Nov. 7, 2019

(30) Foreign Application Priority Data
Apr. 14, 2016 (EP) .................... 16165333

(51) Int. Cl.
| | | |
|---|---|---|
| *C08L 23/10* | (2006.01) | |
| *C08F 297/08* | (2006.01) | |
| *C08L 23/08* | (2006.01) | |
| *C08F 10/00* | (2006.01) | |
| *C08F 210/06* | (2006.01) | |
| *C08L 23/14* | (2006.01) | |
| *C08F 4/651* | (2006.01) | |
| *C08L 23/16* | (2006.01) | |
| *C08F 210/16* | (2006.01) | |

(52) U.S. Cl.
CPC .......... *C08F 297/083* (2013.01); *C08F 4/651* (2013.01); *C08F 10/00* (2013.01); *C08F 210/06* (2013.01); *C08F 210/16* (2013.01); *C08L 23/0815* (2013.01); *C08L 23/10* (2013.01); *C08L 23/14* (2013.01); *C08L 23/16* (2013.01); *C08F 2500/04* (2013.01); *C08F 2500/12* (2013.01); *C08F 2500/17* (2013.01); *C08L 2205/025* (2013.01); *C08L 2666/06* (2013.01)

(58) Field of Classification Search
CPC ........ C08L 297/03; C08L 10/00; C08L 4/651; C08L 210/16; C08L 210/06; C08L 2500/12; C08L 2500/17; C08L 2500/04; C08L 23/10; C08L 23/14; C08L 23/16; C08L 23/0815; C08L 2666/06; C08L 2205/025
See application file for complete search history.

(56) References Cited

U.S. PATENT DOCUMENTS

| | | |
|---|---|---|
| 6,441,094 B1 | 8/2002 | Cecchin et al. |
| 2012/0178883 A1* | 7/2012 | Massari et al. ..... C08F 297/083 525/240 |
| 2013/0123432 A1* | 5/2013 | Ciarafoni et al. ...... C08L 23/12 525/240 |

FOREIGN PATENT DOCUMENTS

| | | |
|---|---|---|
| RU | 2232783 C2 | 7/2004 |
| WO | 2011035994 A1 | 3/2011 |
| WO | 2012010678 A1 | 1/2012 |
| WO | 2012049204 A1 | 4/2012 |

OTHER PUBLICATIONS

PCT International Search Report and Written Opinion dated May 17, 2017 (May 17, 2017) for Corresponding PCT/EP2017/056391.

* cited by examiner

*Primary Examiner* — Nathan M Nutter

(57) ABSTRACT

A propylene composition comprising:
A) from 60 wt % to 75 wt %, of a propylene homopolymer having a Polydispersity Index (P.I.) value from 4.3 to 4.9, a fraction insoluble in xylene at 25° C., higher than 95%, based upon the weight of the propylene homopolymer, and MFR (Melt Flow Rate according to ISO 1133, condition L, at 230° C. and 2.16 kg load) ranging from 20 to 75 g/10 min;
B) from 25 wt % to 40 wt %, of a copolymer of propylene with from 46.0 wt % to 49.0 wt %; of ethylene derived units, based upon the weight of the propylene copolymer; wherein the propylene polymer composition having an intrinsic viscosity of the fraction soluble in xylene at 25° C. between 2.2 to 2.9 dl/g; and the relation:

$$10.7 + 1.3 \times MFR_a - 17.7 \times P.I. - 29.3 \times IV + 4.9 \times Xs \quad (I)$$

between about 40 to about 66;
wherein the amount of A+B is equal to 100 wt %.

11 Claims, No Drawings

PROPYLENE POLYMER COMPOSITIONS

This application is the U.S. National Phase of PCT International Application PCT/EP2017/056391, filed Mar. 17, 2017, claiming benefit of priority to European Patent Application No. 16165333.2, filed Apr. 14, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a propylene polymer composition.

BACKGROUND OF THE INVENTION

Isotactic polypropylene is endowed with excellent properties and suitable for a number of uses. In some instances, the stereoregular homopolymerization process has been introduced a copolymerization step or a monomer has been introduced in a homopolymer matrix to improve the properties.

SUMMARY OF THE INVENTION

In a general embodiment, the present disclosure provides a propylene polymer composition made from or containing:

A) from about 60 wt % to about 75 wt %, of a propylene homopolymer having a Polydispersity Index (P.I.) value from about 4.3 to about 4.9, a fraction insoluble in xylene at 25° C., higher than about 95%, based upon the weight of the propylene homopolymer, and MFR (Melt Flow Rate according to ISO 1133, condition L, at 230° C. and 2.16 kg load) ranging from about 20 to about 75 g/10 min;

B) from about 25 wt % to about 40 wt %, of a copolymer of propylene with from about 46.0 wt % to about 49.0 wt %; of ethylene derived units, based upon the weight of the propylene copolymer;

wherein the propylene polymer composition having an intrinsic viscosity of the fraction soluble in xylene at 25° C. between about 2.2 to about 2.9 dl/g; and the relation:

$$10.7+1.3\times MFRa-17.7\times P.I.-29.3\times IV+4.9\times Xs \qquad (I)$$

between about 40 to about 66;
wherein MFRa is the melt flow rate of the component A);
P.I. is the polydispersity index of component A);
IV is the intrinsic viscosity of the fraction soluble in xylene at 25° C.; and
Xs is the fraction soluble in xylene at 25° C.; and
wherein the amount of A+B is equal to 100 wt %.

DETAILED DESCRIPTION OF THE INVENTION

In some embodiments, the present disclosure provides a propylene polymer composition made from or containing:

A) from about 60 wt % to about 75 wt %, alternatively from about 62 wt % to about 72 wt %, alternatively from about 63 wt % to about 71 wt %, of a propylene homopolymer having a Polydispersity Index (P.I.) value of from about 4.3 to about 4.9, alternatively from about 4.4 to about 4.9; a fraction insoluble in xylene at 25° C. higher than about 95 wt %, alternatively higher than about 97 wt %, based upon the weight of the propylene homopolymer; and a MFR (Melt Flow Rate according to ISO 1133, condition L, at 230° C. and 2.16 kg load) ranging from about 20 to about 75 g/10 min, alternatively from about 25 to about 70 g/10 min.;

B) from about 25 wt % to about 40 wt %, alternatively from about 28 wt % to about 38 wt %, alternatively from about 29 wt % to about 37 wt % of a copolymer of propylene with from about 46.0 wt % to about 49.0 wt %; alternatively from about 47.0 wt % to about 48.5 wt %; of ethylene derived units, based upon the total weight of the propylene copolymer;

the composition having an intrinsic viscosity of the fraction soluble in xylene at 25° C. comprised between about 2.2 to about 2.9 dl/g; alternatively between about 2.4 to about 2.9 dl/g and a fraction soluble in xylene at 25° C., Xs, between about 25.0 wt % to about 34.0 wt %; alternatively between about 26.5 wt % to about 32.5 wt %, based upon the total weight of the composition; and wherein the results of the following relation (I):

$$10.7+1.3\times MFRa-17.7\times P.I.-29.3\times IV+4.9\times Xs \qquad (I)(I)$$

is between about 40 to about 66; alternatively between about 45 to about 60;
alternatively between about 50 to about 55;
wherein MFRa is the melt flow rate of the component A);
P.I. is the polydispersity index of component A);
IV is the intrinsic viscosity of the fraction soluble in xylene at 25° C.; and
Xs is the fraction soluble in xylene at 25° C. of the composition; and
wherein the amount of A+B is equal to 100 wt %

As used herein, the term "copolymer" is limited to polymers containing only propylene and ethylene.

In some embodiments, the propylene composition has an high IZOD value at 0° C., that is higher than about 40 KJ/m² alternatively higher than about 45 KJ/m². In some embodiments, the propylene composition is useful for injection molded articles, alternatively an injection molded container to be used at a low temperature.

In some embodiments, the propylene polymer compositions are prepared by sequential polymerization in at least two stages, with each subsequent polymerization stage being conducted in the presence of the polymeric material formed in the immediately preceding polymerization reaction, wherein the copolymer (A) is prepared in at least one first polymerization stage and the copolymer (B) is prepared in at least one second polymerization stage.

In some embodiments, each polymerization stage is carried out in presence of a highly stereospecific heterogeneous Ziegler-Natta catalyst. In some embodiments, the Ziegler-Natta catalysts are made from or contain a solid catalyst component made from or containing at least one titanium compound having at least one titanium-halogen bond and at least an electron-donor compound (internal donor), both supported on magnesium chloride. In some embodiments, the Ziegler-Natta catalysts systems are further made from or contain an organo-aluminum compound as a co-catalyst and optionally an external electron-donor compound.

In some embodiments, the catalysts systems are as described in the European Patent Nos. EP45977, EP361494, EP728769, and EP 1272533 and Patent Cooperation Treaty Publication No. WO00163261, incorporated herein by reference.

In some embodiments, the solid catalyst component is made from or contains Mg, Ti, halogen and an electron donor selected from succinates of formula (I):

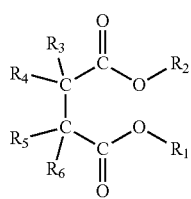

wherein the radicals $R^1$ and $R^2$, equal to or different from each other, are a $C_1$-$C_{20}$ linear or branched alkyl, alkenyl, cycloalkyl, aryl, arylalkyl or alkylaryl group, optionally containing heteroatoms belonging to groups 15-17 of the periodic table; the radicals $R^3$ to $R^6$ equal to or different from each other, are hydrogen or a $C_1$-$C_2$ linear or branched alkyl, alkenyl, cycloalkyl, aryl, arylalkyl or alkylaryl group, optionally containing heteroatoms, and the radicals $R^3$ to $R^6$ which are joined to the same carbon atom can be linked together to form a cycle.

In some embodiments, $R^1$ and $R^2$ are $C_1$-$C_8$ alkyl, cycloalkyl, aryl, arylalkyl and alkylaryl groups.

In some embodiments, the compounds have $R^1$ and $R^2$ selected from primary alkyls and alternatively branched primary alkyls. In some embodiments, $R^1$ and $R^2$ groups are selected from the group consisting of methyl, ethyl, n-propyl, n-butyl, isobutyl, neopentyl, 2-ethylhexyl. In some embodiments, $R^1$ and $R^2$ groups are selected from the group consisting of ethyl, isobutyl, and neopentyl.

In some embodiments, $R^3$ to $R^5$ are hydrogen and $R^6$ is a branched alkyl, cycloalkyl, aryl, arylalkyl and alkylaryl radical having from 3 to 10 carbon atoms. In some embodiments, at least two radicals from $R^3$ to $R^6$ are different from hydrogen and are selected from $C_1$-$C_{20}$ linear or branched alkyl, alkenyl, cycloalkyl, aryl, arylalkyl or alkylaryl group, optionally containing heteroatoms belonging to groups.

In some embodiments, the two radicals different from hydrogen are linked to the same carbon atom. In some embodiments, the two radicals different from hydrogen are linked to different carbon atoms. In some embodiments, the radicals are $R^3$ and $R^5$ or $R^4$ and $R^6$.

In some embodiments, the solid catalyst component is prepared by reacting a titanium compound of formula $Ti(OR)_{n-y}X_y$, where n is the valence of titanium and y is a number between 1 and n, alternatively TiC4, with a magnesium chloride deriving from an adduct of formula $MgCl_2 \cdot pROH$, where p is a number between about 0.1 to about 6, alternatively from about 2 to about 3.5, and R is a hydrocarbon radical having 1-18 carbon atoms. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the spherical adducts are prepared as described in U.S. Pat. Nos. 4,399,054 and 4,469,648, incorporated herein by reference. In some embodiments, the adduct is directly reacted with the Ti compound. In some embodiments, the adduct is subjected to thermal controlled dealcoholation (80-130° C.) to obtain an adduct in which the number of moles of alcohol is lower than about 3, alternatively between about 0.1 to about 2.5. In some embodiments, the reaction with the Ti compound is carried out by suspending the adduct in cold $TiCl_4$; the mixture is heated up to 80-130° C. and kept at this temperature for 0.5-2 hours. In some the adduct is dealcoholated. In some embodiments, the cold $TiCl_4$ is at about 0° C. In some embodiments, the treatment with $TiCl_4$ is carried out one or more times. In some embodiments, the internal donor is added during the treatment with $TiCl_4$ and the treatment with the electron donor compound is repeated one or more times. In some embodiments, the succinate of formula (I) is used in molar ratio with respect to the $MgCl_2$ of from about 0.01 to about 1, alternatively from about 0.05 to about 0.5. In some embodiments, the catalyst components in spherical form are prepared as described in European Patent Application No. EP-A-395083 or Patent Cooperation Treaty Publication No. WO98144001, incorporated herein by reference. In some embodiments, the solid catalyst components show a surface area (by B.E.T. method) between about 20 and about 500 m$^2$/g and alternatively between about 50 and about 400 m$^2$/g, and a total porosity (by B.E.T. method) higher than about 0.2 cm$^3$/g alternatively between about 0.2 and 0.6 cm$^3$/g. In some embodiments, porosity (Hg method) due to pores with radius up to 10.000 A ranges from about 0.3 to about 1.5 cm$^3$/g, alternatively from about 0.45 to about 1 cm$^3$/g.

In some embodiments, the organo-aluminum compound is an alkyl-Al selected from the trialkyl aluminum compounds. In some embodiments, the trialkyl aluminum compounds are triethylaluminum, triisobutylaluminum, tri-n-butylaluminum, tri-n-hexylaluminum, or tri-n-octylaluminum. In some embodiments, the organo-aluminum compounds is a mixture of trialkylaluminums with alkylaluminum halides, alkylaluminum hydrides or alkylaluminum sesquichlorides. In some embodiments, the alkylaluminum sesquichlorides $AlEt_2Cl$ or $Al_2Et_3Cl_3$.

In some embodiments, the external electron-donor compounds include silicon compounds, ethers, esters, amines, heterocyclic compounds, ketones and 1,3-diethers. In some embodiments, the external electron-donor compound is ethyl 4-ethoxybenzoate. In some embodiments, the external electron-donor compound is 2,2,6,6-tetramethyl piperidine. In some embodiments, the external donor compounds are silicon compounds of formula $R_a^5 R_b^6 Si(OR^7)_c$ where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the silicon compounds are selected from the group consisting of methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-metildimethoxysilane. The external electron donor compound is used in such an amount to give a molar ratio between the organo-aluminum compound and the electron donor compound of from about 0.1 to about 500.

In some embodiments, the polymerization process is carried out in gas phase, in liquid phase, in continuous or batch reactors. In some embodiments, the reactors are fluidized bed reactors. In some embodiments, the reactors are slurry reactors. In some embodiments, the polymerization of the propylene polymer (A) is carried out in liquid phase, using liquid propylene as diluent, while the copolymerization stage to obtain the propylene copolymer fraction (B) is carried out in gas phase, without intermediate stages except for the partial degassing of the monomers. Alternatively, the sequential polymerization stages are carried out in gas phase. The reaction time, temperature and pressure of the polymerization steps are not critical. In some embodiments, the temperature for the preparation of fraction (A) and (B), that can be the same or different, is from 50° C. to 120° C. In some embodiments, the polymerization pressure ranges from about 0.5 to about 12 MPa if the polymerization is carried out in gas-phase. In some embodiments, the catalytic system is pre-contacted (pre-polymerized) with small amounts of olefins. In some embodiments, the molecular weight of the propylene polymer composition is regulated by using regulators. In some embodiments, the regulator is hydrogen.

In some embodiments, the propylene polymer (A) is produced by a gas-phase polymerization process carried out in at least two interconnected polymerization zones. In some embodiments, the polymerization process is as described in Patent Cooperation Treaty Publication No. WO 00/02929, incorporated herein by reference.

The process is carried out in a first and in a second interconnected polymerization zone to which propylene and ethylene or propylene and alpha-olefins are fed in the presence of a catalyst system and from which the polymer produced is discharged. The growing polymer particles flow through the first of the polymerization zones (riser) under fast fluidization conditions, leave the first polymerization zone and enter the second of the polymerization zones (downcomer) through which the polymer particles flow in a densified form under the action of gravity, leave the second polymerization zone and are reintroduced into the first polymerization zone, thus establishing a circulation of polymer between the two polymerization zones. In some embodiments, the conditions of fast fluidization in the first polymerization zone is established by feeding the monomers gas mixture below the point of reintroduction of the growing polymer into the first polymerization zone. In some embodiments, the velocity of the transport gas into the first polymerization zone is higher than the transport velocity under the operating conditions and is between about 2 and about 15 m/s In the second polymerization zone, where the polymer flows in densified form under the action of gravity, high values of density of the solid are reached which approach the bulk density of the polymer. In some embodiments, a positive gain in pressure is obtained along the direction of flow, so that the process may reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is between about 5 and about 80% of the total pressure of the gases. In some embodiments, the operating parameters such as the temperature are those that are useful in gas-phase olefin polymerization processes. In some embodiments, the temperatures are between 50° C. and 120° C. In some embodiments, the process is carried out under operating pressure of between about 0.5 and about 10 MPa, alternatively between about 1.5 and about 6 MPa. In some embodiments, the various catalyst components are fed to the first polymerization zone, at any point of the first polymerization zone. In some embodiments, the various catalyst components are fed at any point of the second polymerization zone. In some embodiments, molecular weight regulators are used to regulate the molecular weight of the growing polymer. In some embodiments, the molecular weight regulator is hydrogen.

In some embodiments, the propylene/ethylene copolymer (B) is produced in a fluidized-bed gas-phase reactor in the presence of the polymeric material and the catalyst system coming from the preceding polymerization step. The polymerization mixture is discharged from the downcomer to a gas-solid separator, and subsequently fed to the fluidized-bed gas-phase reactor.

In some embodiments, the propylene polymer compositions are further made from or contain additives. In some embodiments, the additives include antioxidants, light stabilizers, nucleating agents, antiacids, colorants and fillers.

In some embodiments, the propylene polymer compositions are used to make molded articles, alternatively injection-molded items. In some embodiments, the injection-molded articles have good flexibility and good impact properties, including at low temperatures.

The following examples are given to illustrate and not to limit the present disclosure.

EXAMPLES

The data of the propylene polymer materials were obtained according to the following methods:

Xylene-Soluble Faction at 25° C.

The Xylene Soluble fraction was measured according to ISO 16152, 2005, but with the following deviations (between parentheses). The solution volume was 250 ml (200 ml). During the precipitation stage at 25° C. for 30 min, the solution, for the final 10 minutes, was kept under agitation by a magnetic stirrer (30 min, without any stirring at all). The final drying step was done under vacuum at 70° C. (100° C.). The content of the xylene-soluble fraction was expressed as a percentage of the original 2.5 grams and then, by difference (complementary to 100), the xylene unsoluble %.

Ethylene ($C_2$) Content $^{13}C$ NMR of Propylene/Ethylene Copolymers $^{13}C$ NMR spectra were acquired on a Bruker AV-600 spectrometer equipped with cryoprobe, operating at 160.91 MHz in the Fourier transform mode at 120° C.

The peak of the $S_{\beta\beta}$ carbon was used as internal reference at 29.9 ppm. (The nomenclature was according to C. J. Carman, R. A. Harrington and C. E. Wilkes, "Monomer Sequence Distribution in Ethylene-Propylene Rubber Measured by 13C NMR. 3. Use of Reaction Probability Mode," 10 Macromolecules 536 (1977).) The samples were dissolved in 1,1,2,2-tetrachloroethane-d2 at 120° C. with a 8% wt/v concentration. Each spectrum was acquired with a 90° pulse, 15 seconds of delay between pulses and CPD, to remove 1H-13C coupling. 512 transients were stored in 32K data points using a spectral window of 9000 Hz.

The assignments of the spectra, the evaluation of triad distribution and the composition were made according to Kakugo (M. Kakugo, Y. Naito, K. Mizunuma and T. Miyatake, "Carbon-13 NMR determination of monomer sequence distribution in ethylene-propylene copolymers prepared with δ-titanium trichloride-diethylaluminum chloride", 15 Macromolecules 1150 (1982)) using the following equations:

$$PPP=100\ T_{\beta\beta}/S\ PPE=100\ T_{\beta\delta}/S\ EPE=100\ T_{\delta\delta}/S$$

$$PEP=100\ S_{\beta\beta}/S\ PEE=100\ S_{\beta\delta}/S\ EEE=100\ (0.25\ S_{\gamma\delta}+0.5\ S_{\delta\delta})/S$$

$$S=T_{\beta\beta}+T_{\beta\delta}+T_{\delta\delta}+S_{\beta\beta}+S_{\beta\delta}+0.25\ S\ S_{\gamma\delta}+0.5\ S_{\delta\delta}$$

The molar percentage of ethylene content was evaluated using the following equation:

$$E\%\ mol=100*[PEP+PEE+EEE].$$

The weight percentage of ethylene content was evaluated using the following equation:

$$E\ \%\ \text{wt.} = \frac{100 * E\ \%\ \text{mol} * \text{MW}_E}{E\ \%\ \text{mol} * \text{MW}_E + P\ \%\ \text{mol} * \text{MW}_P}$$

where P % mol is the molar percentage of propylene content, while $\text{MW}_E$ and $\text{MW}_P$ are the molecular weights of ethylene and propylene, respectively.

The product of reactivity ratio $r_1 r_2$ was calculated according to Carman (C. J. Carman, R. A. Harrington and C. E. Wilkes, 10 Macromolecules 356 (1977) as:

$$r_1 r_2 = 1 + \left(\frac{EEE + PEE}{PEP} + 1\right) - \left(\frac{P}{E} + 1\right)\left(\frac{EEE + PEE}{PEP} + 1\right)^{0.5}$$

The tacticity of Propylene sequences was calculated as mm content from the ratio of the PPP mm $T_{\beta\beta}$ (28.90-29.65 ppm) and the whole $T_{\beta\beta}$ (29.80-28.37 ppm).

Ethylene C2 content was measured on the final composition. The ethylene content of component B) was than calculated by using the formula $C2tot=X_B C2_B$ wherein $X_B$ is the amount of component B in the composition.

Molar Ratio of Feed Gasses

Determined by gas-chromatography

Melt Flow Rate (MFR)

The melt flow rate MFR of the polymer was determined according to ISO 1133 (230° C., 2.16 Kg).

Intrinsic Viscosity

Determined in tetrahydronaphthalene at 135° C.

Flexural Modulus

Determined according to ISO 178 and supplemental condition according to ISO 1873-2 with specimen injection moulded IZOD Impact Strength Determined according to ISO 180/A, with specimen injection molded according to ISO 1873-2, and according to ISO 3167, notched edgewise (condition 1A, of ISO 1873-2 ed. 1989).

Polydispersity Index (PI): measurement of molecular weight distribution of the polymer. To determine the PI value, the modulus separation at low modulus value, e.g. 500 Pa, was determined at a temperature of 200° C. by using a RMS-800 parallel plates rheometer model marketed by Rheometrics (USA), operating at an oscillation frequency which increased from 0.01 rad/second to 100 rad/second. From the modulus separation value, the PI was derived using the following equation:

PI=54.6×(modulus separation)$^{-1.76}$ wherein the modulus separation (MS) was defined as:

MS=(frequency at $G'$=500 Pa)/(frequency at $G''$=500 Pa)

wherein G' was the storage modulus and G" was the loss modulus.

Examples 1 and 2 Comparative Examples 3-5

The Ziegler-Natta catalyst was prepared according to the Example 5, lines 48-55 of the European Patent No. EP728769, incorporated herein by reference. Triethylalurninium (TEAL) was used as co-catalyst and dicyclopentyldimethoxysilane was used as external donor.

The propylene polymer compositions of the examples were prepared in a two-step polymerization process, wherein the copolymer (A) was prepared in the first polymerization step by feeding the monomers and the catalyst system to a gas-phase polymerization reactor including two interconnected polymerization zones, a riser and a downcomer, as described in Patent Cooperation Treaty Publication No. WO 00/02929, incorporated herein by reference, thereby permitting the concentration of hydrogen in the riser to be different from the concentration of hydrogen in the downcomer.

The polymerization mixture was discharged from the reactor, conveyed to a gas-solid separator and the polymerized material was sent into a gas-phase fluidized-bed reactor where the propylene ethylene copolymer (B) was produced. The operative conditions are indicated in Table 1.

The polymer particles exiting from the second polymerization step were subjected to a steam treatment, to remove the unreacted monomers, and then dried.

TABLE 1

|  |  | Example | | |
|---|---|---|---|---|
|  |  | 1 | 2 | Comp 3 |
| Component A) | | | | |
| TEAL/external donor | wt/wt | 10 | 10 | 20 |
| TEAL/catalyst | wt/wt | 6 | 6 | 6 |
| Temperature | ° C. | 70 | 70 | 70 |
| Pressure | bar-g | 28 | 24 | 28 |
| Split holdup riser | wt % | 35 | 37 | 34 |
| downcomer | wt % | 65 | 63 | 66 |
| $C_3$ riser | mole % | 57.5 | 61.6 | 58.1 |
| $C_3$ downcomer | mol/mol | 55.2 | 58.7 | 60.3 |
| $H_2/C_3^-$ riser | mol/mol | 0.2 | 0.12 | 0.26 |
| $H_2/C_3^-$ downcomer | mol/mol | 0.032 | 0.021 | 0.0055 |
| Component B (gas phase reactor) | | | | |
| Temperature | ° C. | 80 | 80 | 80 |
| Pressure | Barg | 18 | 18 | 18 |
| Split* | % | 35 | 34 | 36 |
| $C_2/C_2 + C_3$ | mol/mol | 0.41 | 0.41 | 0.415 |
| $H_2/C_2^-$ | mol/mol | 0.069 | 0.08 | 0.052 |

|  |  | Example | |
|---|---|---|---|
|  |  | com 4 | comp 5 |
| Component A) | | | |
| TEAL/external donor | wt/wt | 20 | 20 |
| TEAL/catalyst | wt/wt | 6 | 6 |
| Temperature | ° C. | 70 | 70 |
| Pressure | bar-g | 28 | 28 |
| Split holdup riser | wt % | 32 | 33 |
| downcomer | wt % | 68 | 67 |
| $C_3$ riser | mole % | 57.1 | 57.5 |
| $C_3$ downcomer | mol/mol | 59.5 | 63.1 |
| $H_2/C_3^-$ riser | mol/mol | 0.261 | 0.264 |
| $H_2/C_3^-$ downcomer | mol/mol | 0.008 | 0.0063 |
| Component B (gas phase reactor) | | | |
| Temperature | ° C. | 80 | 80 |
| Pressure | Barg | 18 | 18 |
| Split* | % | 33 | 39 |
| $C_2/C_2 + C_3$ | mol/mol | 0.42 | 0.415 |
| $H_2/C_2^-$ | mol/mol | 0.042 | 0.046 |

C2 ethylene; C3 propylene; H2 hydrogen
*Amount of component B with respect to A + B
$C_2^-$ = ethylene $C_3^-$ = propylene To the material obtained according to example 1-2 and comparative examples 3-5, the following additives were added:

| | | |
|---|---|---|
| polymer of examples 1, 2 comp ex 3-5 | wt % | 98.988 |
| DIHYDROTALCIT - DHT 4A (KISUMA) | wt % | 0.0400 |
| IRGAFOS 168 | wt % | 0.0860 |
| IRGANOX 1010 | wt % | 0.0440 |
| TALC-HM05 | wt % | 0.8500 |

The materials were extruded and analyzed, The properties are reported in Table 2.

| | | Example | | |
|---|---|---|---|---|
| | | 1 | 2 | Comp ex 3 |
| MFR of the component A) | g/10 min | 60 | 30 | 38 |
| Polydispersity | | 4.8 | 4.5 | 5.0 |
| Xylene solubles at 25° C. | % | 2.2 | 2.0 | 2.9 |
| % copolymer component B) | wt % | 30 | 36 | 29 |
| % C$_2^-$ component B) | wt % | 48 | 46 | 49 |
| properties of the composition | | | | |
| MFR of the composition | g/10 min | 14.5 | 8.0 | 8.4 |
| Xylene soluble at 25° C., Xs | % | 27.1 | 31.8 | 26.6 |
| XsIV | dl/g | 2.84 | 2.49 | 2.90 |
| Flexural Modulus | MPa | 850 | 910 | 1020 |
| Izod Impact 0° C. | kJ/m2 | 50.9 | 51.0 | 15.1 |
| Izod Impact −20° C. | kJ/m2 | 15.3 | 12.9 | 11.2 |
| relation (I) | | 53.3 | 52.9 | 17.0. |

| | | Example | |
|---|---|---|---|
| | | comp 4 | comp 5 |
| MFR of the component A) | g/10 min | 45 | 40 |
| Polydispersity | | 5.0 | 5.4 |
| Xylene soluble at 25° C. | % | 2.7 | 2.7 |
| % copolymer component B) | wt % | 30 | 32 |
| % C$_2^-$ component B) | wt % | 49 | 49 |
| properties of the composition | | | |
| MFR of the composition | g/10' | 7.9 | 8.3 |
| Xylene soluble at 25° C., Xs | % | 27.4 | 28.6 |
| XsIV | dl/g | 3.35 | 3.04 |
| Flexural Modulus | MPa | 1040 | 970 |
| Izod Impact 0° C. | kJ/m2 | 14.7 | 16.2 |
| Izod Impact −20° C. | kJ/m2 | 9.0 | 9.5 |
| relation (I) | | 18.3 | 18.2 |

C$_2^-$ = ethylene
XsIV = intrinsic viscosity of fraction soluble in xylene at 25° C.

What is claimed is:

1. A propylene polymer composition comprising:
A) from 60 wt % to 75 wt %, of a propylene homopolymer having a Polydispersity Index (P.I.) value from 4.3 to 4.9, a fraction insoluble in xylene at 25° C., higher than 95%, based upon the weight of the propylene homopolymer, and MFR (Melt Flow Rate according to ISO 1133, condition L, at 230° C. and 2.16 kg load) ranging from 20 to 75 g/10 min;
B) from 25 wt % to 40 wt %, of a copolymer of propylene with from 46.0 wt % to 49.0 wt %; of ethylene derived units, based upon the weight of the propylene copolymer;
wherein the propylene polymer composition having an intrinsic viscosity of the fraction soluble in xylene at 25° C. between 2.2 to 2.9 dl/g; and the relation:

$$10.7+1.3\times MFRa-17.7\times P.I.-29.3\times IV+4.9\times Xs \qquad (I)$$

between 40 to 66; wherein
MFRa is the melt flow rate of the component A);
P.I. is the polydispersity index of component A);
IV is the intrinsic viscosity of the fraction soluble in xylene at 25° C.; and
Xs is the fraction soluble in xylene at 25° C. of the composition; and
wherein the amount of A+B is equal to 100 wt %.

2. The propylene polymer composition according to claim 1, wherein component A) has MFR (Melt Flow Rate according to ISO 1133, condition L, at 230° C. and 2.16 kg load) ranging from 25 to 70 g/10 min.

3. The propylene polymer composition according to claim 1, wherein component B) has from 47.0 wt % to 48.5 wt %; of ethylene derived units, based upon the total weight of the propylene copolymer.

4. The propylene polymer composition according to claim 1, having an intrinsic viscosity of the fraction soluble in xylene at 25° C. between 2.4 to 2.9 dl/g.

5. The propylene polymer composition according to claim 1, wherein component A) ranges from 62 wt % to 72 wt %, and component B) ranges from 28 wt % to 38 wt %.

6. The propylene polymer composition according to claim 1, wherein the result of relation (I)

$$10.7+1.3\times MFRa-17.7\times P.I.-29.3\times IV+4.9\times Xs \qquad (I);$$

is between 45 to 60.

7. The propylene polymer composition according to claim 1, wherein the result of relation (I)

$$10.7+1.3\times MFRa-17.7\times P.I.-29.3\times IV+4.9\times Xs \qquad (I);$$

is between 50 to 55.

8. The propylene polymer composition according to claim 1, wherein component A) ranges from 63 wt % to 71 wt %, and component B) ranges from 29 wt % to 37 wt %.

9. The propylene polymer composition according to claim 1, wherein the fraction insoluble in xylene at 25° C. of component A) is higher than 97 wt %, based upon the weight of the propylene homopolymer.

10. The propylene polymer composition according to claim 1, wherein in component B) the copolymer of propylene comprises from 47.0 wt % to 48.5 wt %; of ethylene derived units, based upon the weight of the propylene copolymer.

11. A molded article comprising the propylene polymer composition of claim 1.

* * * * *